Patented Nov. 21, 1950

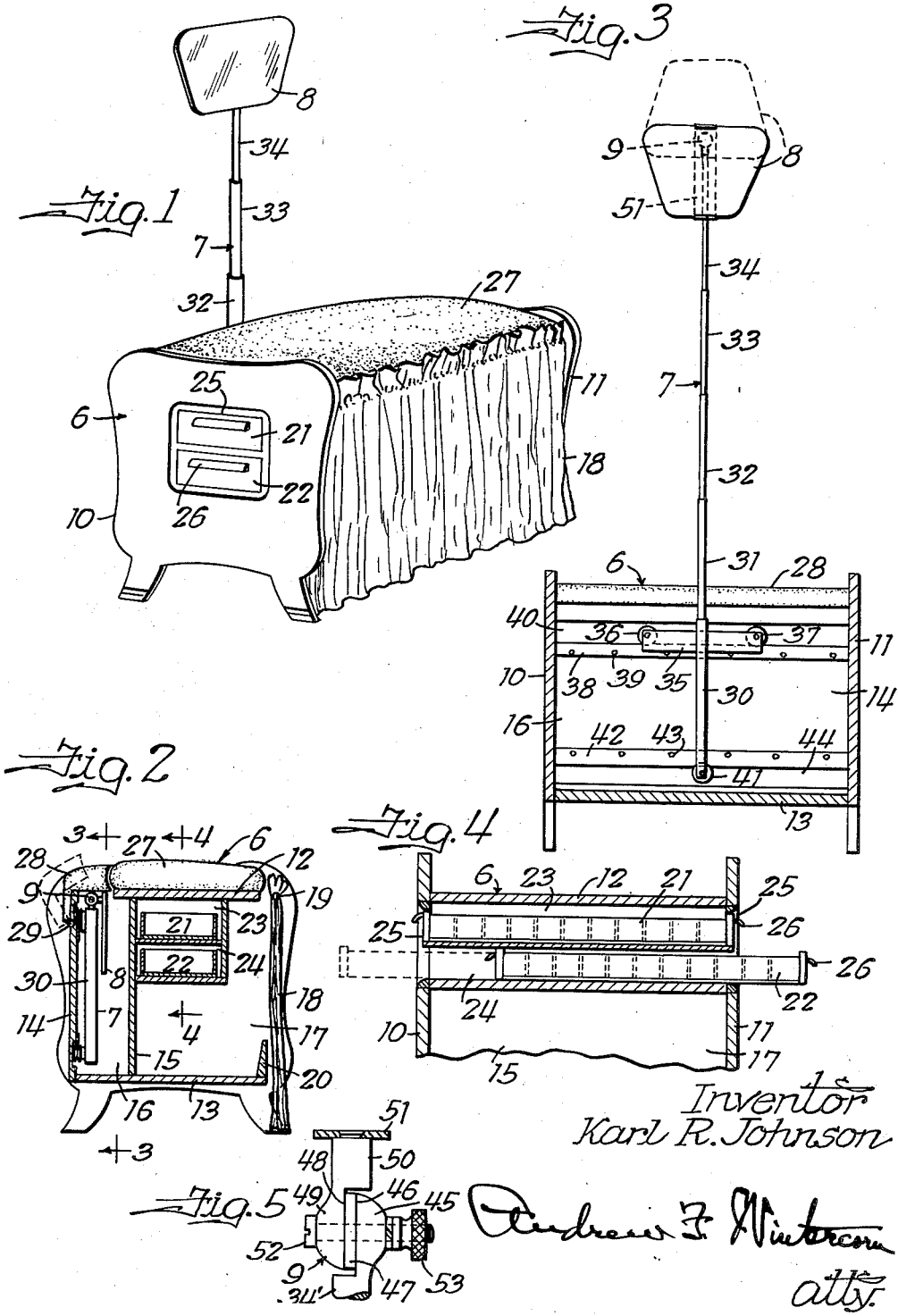

2,531,217

UNITED STATES PATENT OFFICE 2,531,217

VANITY BENCH AND MIRROR

Karl R. Johnson, Rockford, Ill.

Application March 29, 1946, Serial No. 658,101

15 Claims. (Cl. 155—188)

This invention relates to a new and improved vanity bench and disappearing or concealable mirror therefor.

The principal object of my invention is to provide a vanity bench having a rear compartment in which a mirror is adjustably mounted on an extensible telescoping type of supporting arm, so that the mirror may be quickly and easily withdrawn and as easily put away in its compartment where it will be out of sight and out of the way and there will be no danger of its breakage, the rear section of the cushion for the bench being preferably hinged to form a closure for the open top of the mirror compartment for complete concealment of the mirror when not in use.

Another object is to provide a device of the kind mentioned in which the bottom section of the telescoping mirror supporting arm is mounted for lateral movement by means of rollers arranged in a T-formation and working on upper and lower horizontal tracks provided therefor on the back wall of the mirror compartment, thus permitting easy shifting of the mirror from one end to the other of the bench as required in viewing the head from all angles in arranging the hair, the T-arrangement of the rollers being advantageous from the standpoint that it eliminates a tendency for any binding action and permits easy shifting of the mirror support by lateral pressure thereon at an appreciable distance above the level of the rollers and tracks.

The invention is illustrated in the accompanying drawing, in which

Fig. 1 is a perspective view of a vanity bench and mirror made in accordance with my invention;

Fig. 2 is a cross-section through the bench showing the mirror support in collapsed form;

Fig. 3 is a longitudinal section through the mirror compartment taken on the line 3—3 of Fig. 2 but showing the mirror support extended;

Fig. 4 is another longitudinal section on the line 4—4 of Fig. 2, and

Fig. 5 is an enlarged detail of the mirror hinge.

The same reference numerals are applied to corresponding parts throughout the views.

Referring to the drawing, the vanity bench is indicated generally by the reference numeral 6, and 7 is a telescoping type of supporting arm for the mirror 8, the latter being hinged, as indicated at 9, to the upper end of the arm 7 to permit inclination of the mirror at different angles relative to a vertical axis, that being particularly important when the mirror is disposed in the reversed position indicated in dotted lines in Fig. 3 for viewing the top of the head. The bench 6 comprises end members 10 and 11 interconnected by top and bottom pieces 12 and 13 and a back wall 14. 15 is an inner vertical wall in spaced relation to the back wall 14 and defining the front of a mirror compartment 16 that extends the full length of and is provided in the back portion of the bench. A larger open front storage compartment 17 is provided in the bench extending the full length thereof, which is arranged to be concealed by curtains or drapes 18 slidable on a rod 19 that is supported at its opposite ends on the end members 10 and 11 of the bench. A front cross-piece 20 on the bottom 13 serves to retain articles in the compartment 17 against accidental displacement. There is ample space in this compartment for a woman's shoes, slippers, and other miscellaneous articles. Two drawers are indicated at 21 and 22 which extend the full length of the bench and operate in guides 23 and 24 provided between the openings 25 in the end members 10 and 11. These drawers have pulls 26 on both ends and may be extended from either end of the bench, as indicated in Fig. 4. Stockings and handkerchiefs and other small articles, such as cosmetics, jewelry, and manicure tools and supplies, can be stored in these drawers and will be quickly and easily accessible to a woman seated on the bench, there being usually no necessity for standing up to operate the drawer and to remove and replace articles. Indicated at 27 is the seat cushion which extends the full length of the bench between the end members 10 and 11 and covers all but the top of the mirror compartment 16, a separate narrower rear cushion section 28 being provided as a closure for the open top of the mirror compartment and hinged to the back wall 14, as indicated at 29, so as to be swingable rearwardly to an out of the way position as indicated in dotted lines in Fig. 2 when the mirror 8 is to be withdrawn for use.

The mirror support 7 comprises telescoping vertical tubular sections 30, 31, 32, 33 and 34, the largest section 30, into which the other sections 31—34 are collapsible, having a carrier in the form of a horizontal cross-piece 35 mounted on the upper end portion thereof carrying two rollers 36 and 37 on the opposite ends thereof arranged to run on a horizontal track 38 that is suitably secured to the back wall 14 of the bench, as by screws 39. A groove 40 in the back wall affords operating clearance for the rollers 36 and 37. Another roller 41 is mounted on the lower end of the section 30 and runs on another horizontal track 42 that is suitably secured to the back wall, as by screws 43. A groove 44 in the back wall affords operating clearance for the roller 41. With this T-arrangement of the rollers 36, 37 and 41, there is no tendency for the mirror support to bind when a lateral pressure is applied to it at some point well above the level of the track 38 to move the mirror toward either end of the bench, and this freedom from binding, combined with the anti-friction roller action, accounts for the ease with which the mirror may be adjusted in either direction. This construction, furthermore, is one which can be assembled easily in a furniture factory, and there is nothing to interfere with obtaining reasonably uniform rolling action in quantity production of these vanity benches.

A short rod 34' is pressed into the upper end of the tubular section 34 and has a semi-spherical upper end portion 45, the flat side 46 of which has abutment with a fibre washer 47 which in turn has abutment with the flat side 48 on the semi-spherical end portion 49 of another rod 50 to which the band 51 clamped to the mirror 8 is rigidly secured. A bolt 52 extends through registering center holes in the semi-spherical portions 45 and 49 and washer 47, and a knurled nut 53 is threaded on the projecting end of the bolt and is arranged to be tightened to afford the desired amount of frictional resistance to hinging movement of the mirror so that the mirror will remain in an adjusted position when tilted to the desired angle. It is clear from this description how the mirror 8 may be swung from the full line position in Fig. 3 to the inverted position indicated in dotted lines, and that when so inverted it may be turned around by swivelling the upper section 34 relative to section 33 and may be tilted on the hinge 9 to the desired angle for a good view of the top of the head by reflection in the mirror on the vanity or dresser in front of which the bench is used. When the mirror is in the full line position shown in Figs. 1 and 3, it may be turned about section 34 as an axis to whatever angle is desired in viewing either side and the back of the head, and, of course, it may also be tilted on the hinge 9 to whatever angle is desired. The fact that the hinge 9 is located near the top of the mirror, enables use of a proportionately longer bottom section 30 and telescoping sections 31—34 and staying within the limited height dimension of the mirror compartment 16. The increased length of the sections 30—34 is of advantage because it permits extension of the mirror to the height indicated in Fig. 3, namely, about three times the height of the bench 6, as may be desired in using the mirror 8 while standing in front of the vanity or dresser. In Fig. 1 the mirror 8 is shown at the approximate elevation to which it will be adjusted when used by a person seated on the vanity bench.

It is believed the foregoing description conveys a good understanding of the objects and advantages of my invention. The appended claims have been drawn to cover all legitimate modifications and adaptations.

I claim:

1. In combination, a bench having a fixed seat portion and a cabinet portion therebeneath which includes a mirror storage compartment open at the top thereof behind said seat, said compartment being deep in relation to the fore and aft dimension of the seat, an openable closure for the open top of said compartment, an elongated mirror support rigidly mounted in a substantially vertical plane in and extending substantially the full depth of said compartment, members carried on and extensible upwardly from said support directly through the open top of said compartment when the closure is opened, whereby to support a mirror at a desired elevation relative to said seat, and a mirror carried on said support members.

2. In combination, a bench having a fixed seat portion and a cabinet portion therebeneath which includes a mirror storage compartment open at the top thereof behind said seat, said compartment being deep in relation to the fore and aft dimension of the seat, an elongated mirror support rigidly mounted in a substantially vertical plane in and extending substantially the full depth of said compartment, members carried on and extensible upwardly from said support directly through the open top of said compartment, whereby to support a mirror at a desired elevation relative to said seat, and a mirror carried on said support members.

3. In combination, a bench having an elongated seat portion and an elongated cabinet portion therebeneath which includes a mirror storage compartment extending the full length of the seat open at the top thereof behind said seat, a mirror support, means mounting the support rigidly in a substantially vertical plane in said compartment for movement laterally relative to the back of said seat portion from end to end of said compartment, members carried on and extensible upwardly from said support directly through the open top of said compartment, whereby to support a mirror at a desired elevation relative to said seat, and a mirror carried on said support members.

4. In combination, a bench having a fixed seat portion and a cabinet portion therebeneath which includes a mirror storage compartment open at the top thereof behind said seat, said compartment being deep in relation to the fore and aft dimension of the seat, a mirror support rigidly mounted in a substantially vertical plane in said compartment and extending substantially the full depth thereof and comprising telescoping sections which are vertically disposed in said compartment and extensible and retractable vertically directly through the open top of said compartment, and a mirror on said support.

5. In combination, a bench having an elongated seat portion and an elongated cabinet portion therebeneath which includes a mirror storage compartment extending the full length of the seat open at the top thereof behind said seat, a mirror support in said compartment comprising telescoping sections which are vertically extensible and retractable directly through the open top of said compartment, means mounting said support rigidly in a substantially vertical plane in said compartment for lateral adjustment from end to end of said compartment relative to the back of said seat portion, and a mirror on said support.

6. In combination, a bench having a seat portion and a cabinet portion therebeneath which includes a mirror storage compartment open at the top thereof behind said seat, a mirror support in said compartment comprising telescoping sections which are vertically extensible and retractable, tracks extending substantially horizontally in said compartment lengthwise of the bench and behind said seat portion, roller means mounting said support on said tracks for lateral adjustment relative to the seat portion, and a mirror on said support.

7. In combination, a bench having a seat portion and a cabinet portion therebeneath which includes a mirror storage compartment open at the top thereof behind said seat, a mirror support in said compartment comprising telescoping sections which are vertically extensible and retractable, upper and lower substantially horizontal tracks in said compartment extending lengthwise of the bench and behind said seat portion, rollers in a T-arrangement mounted on said support and operating on said tracks for lateral adjustment relative to the seat portion, said support having at least one roller on its lower end running on the lower track and having at least one roller spaced laterally from each side of said support at its upper end running on the upper track, and a mirror on said support.

8. In combination, a bench having a seat portion and a cabinet portion therebeneath which includes a mirror storage compartment open at the top thereof behind said seat, a track extending substantially horizontally in said compartment lengthwise of the bench and behind said seat portion, a mirror supporting base adjustable laterally on said track, means vertically extensible and retractable relative to said base for support of the mirror, and a mirror carried thereby.

9. In combination, a bench having a seat portion and a cabinet portion therebeneath which includes a mirror storage compartment open at the top thereof behind said seat, two vertically spaced tracks extending substantially horizontally in said compartment lengthwise of the bench and behind said seat portion, a vertically disposed mirror supporting base carrying rollers in a T-arrangement working on said tracks for lateral adjustment relative to the seat, said base having at least one roller on its lower end running on the lower track and having at least one roller spaced laterally from each side of said base at its upper end running on the upper track, means vertically extensible and retractable relative to said base for support of the mirror, and a mirror carried thereby.

10. In combination, a bench having a top seat portion and a cabinet therebeneath which includes a substantially vertical back wall behind the seat portion and extending downwardly relative to the seat nearly to the floor, a vertically elongated mirror support rigidly mounted in a substantially vertical plane on the back wall having members which are vertically extensible therefrom behind the seat, and a mirror extensible from said cabinet with and supported on the extensible members.

11. In combination, a bench having a top seat portion and a cabinet therebeneath which includes a substantially vertical back wall behind the seat portion and extending downwardly relative to the seat nearly to the floor, a vertically elongated mirror support rigidly mounted in a substantially vertical plane on the back wall having members which are vertically extensible therefrom behind the seat, a mirror extensible from said cabinet with and supported on the extensible members, said back wall being spaced rearwardly relative to the back of the seat portion, and an auxiliary rear section for said seat portion hinged relative to the top of the back wall so as to be movable from a position in contiguous coplanar relation with the seat portion rearwardly to an out-of-the-way position.

12. A structure as set forth in claim 10, wherein the mounting for the mirror support includes horizontal guides permitting lateral adjustment of the mirror endwise with respect to the seat.

13. A structure as set forth in claim 11, wherein the mounting for the mirror support includes horizontal guides permitting lateral adjustment of the mirror endwise with respect to the seat.

14. In combination, a bench having a seat portion and a cabinet therebeneath, a mirror support in said cabinet to the rear of and below said seat comprising telescoping sections which are vertically extensible and retractable, a movable carrier for said support guided for sidewise movement substantially horizontally in said cabinet lengthwise of the bench, and a mirror raisable and lowerable with said support.

15. In combination, a bench having a seat portion and a cabinet therebeneath, a mirror supporting base in said cabinet to the rear of and below said seat, means vertically extensible and retractable relative to said base for support of the mirror, a movable carrier for said supporting base guided for sidewise movement substantially horizontally in said cabinet lengthwise of the bench, and a mirror raisable and lowerable with the means extensible and retractable relative to said base.

KARL R. JOHNSON.

REFERENCES CITED

The following references are of record in the file of this patent:

UNITED STATES PATENTS

| Number | Name | Date |
|---|---|---|
| 148,722 | Lucik | Mar. 17, 1874 |
| 224,253 | Waller | Feb. 3, 1880 |
| 568,480 | Fowler | Sept. 29, 1896 |
| 859,494 | Hardesty | July 9, 1907 |
| 1,026,706 | Sears | May 21, 1912 |
| 1,250,946 | Belden | Dec. 25, 1917 |
| 1,338,582 | Morris et al. | Apr. 27, 1920 |
| 1,888,325 | McCarroll | Nov. 22, 1932 |
| 2,097,129 | Miserendino | Oct. 1, 1935 |